June 10, 1930.  A. C. GILBERT  1,763,301
MIXING DEVICE
Filed July 1, 1927
Fig.1.
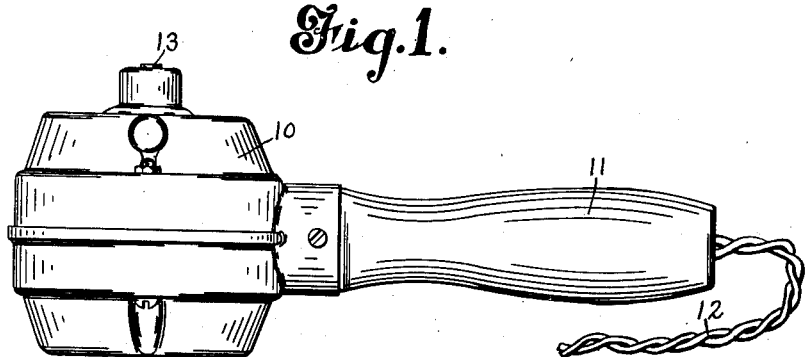
Fig.6.
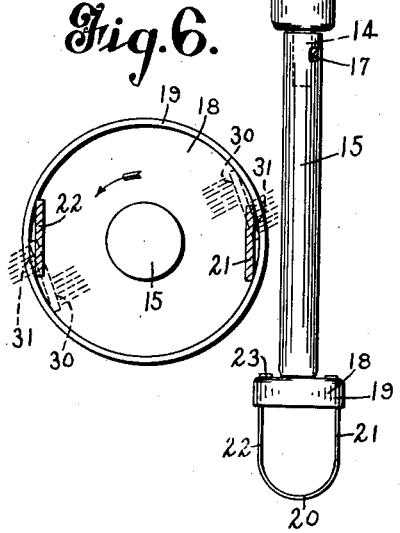
Fig.2. Fig.3.
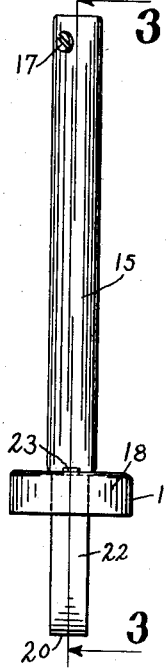
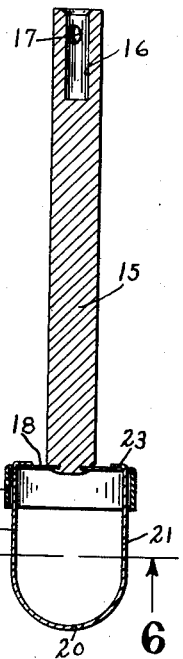
Fig.4. Fig.5.
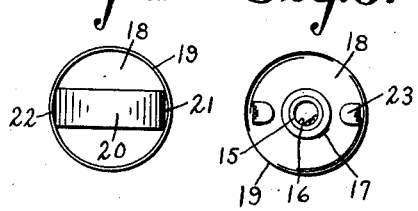
Inventor
Alfred C. Gilbert
By Cockrell and Bartholow
Attorneys Patented June 10, 1930

1,763,301

UNITED STATES PATENT OFFICE

ALFRED C. GILBERT, OF HAMDEN, CONNECTICUT, ASSIGNOR, BY MESNE ASSIGNMENTS, TO THE A. C. GILBERT COMPANY, OF NEW HAVEN, CONNECTICUT, A CORPORATION OF MARYLAND

MIXING DEVICE

Application filed July 1, 1927. Serial No. 202,922.

This invention relates to apparatus for churning, beating or thoroughly mixing materials of a semi-plastic nature, and is especially adaptable for use as a household device for mixing cake batter, frostings, cream, etc., and relates more especially to such apparatus in which the beating or mixing element is rotated by an electric motor. This invention particularly relates to a mixing or beating element adapted for use in this class of beaters or mixers for semi-plastic material.

One object of this invention is to provide an inexpensive, efficient and readily portable beating or mixing apparatus, which may be used either by being held in the hand of the user, or supported upon a suitable standard or the like.

Another object of this invention is to provide for use with beating or mixing apparatus of this type, an improved stirring or beating element by the use of which the material will be thoroughly and efficiently beaten or mixed.

A further object of this invention is to provide an improved form of beating element adapted to be detachably connected to suitable rotating means, and which comprises a combination of novel features, the combined action of which when the device is rotated, will result in a thoroughly agitated and intermingled mass of material.

To these and other ends, the invention consists in the novel features and combinations of parts to be hereinafter described and claimed.

In the accompanying drawings:

Fig. 1 is a side view of a mixing apparatus, embodying the features of my invention;

Fig. 2 is an elevational view of my novel and improved beating or mixing element, which embodies certain features of this invention;

Fig. 3 is a section on line 3—3 of Fig. 2;

Fig. 4 is a bottom end view of the beating element;

Fig. 5 is a top end view of the same, and

Fig. 6 is an enlarged sectional view on line 6—6 of Fig. 3, partially illustrating the operation of the beating element.

The mixing apparatus selected to illustrate the features of my invention comprises an electric motor 10, secured to which is a handle 11, through which the power leads 12 are threaded. The armature shaft 13 of the motor is provided with an extension 14 at one end thereof, to permit the connection thereto of various appliances.

The mixing or beating element, provided in this instance with an elongated stem or shank 15, is secured to the shaft end 14 by the disposition of the shaft end in a longitudinally directed opening 16 formed in one end of the stem 15, and clamped therein by means of the clamp screw 17. An inverted cup-shaped part 18 is secured to one end of the stem 15 and comprises a disk-shaped portion having a flange 19 depending substantially perpendicularly from the periphery thereof. Secured to the cup-shaped part 18 is a U-shaped loop part 20, the legs 21 and 22 of which extend toward and through the disk-shaped portion of part 18 and have the ends 23 thereof bent over upon the outer surface of the part 18 to secure the parts together.

The part 20 is formed of substantially flat narrow strip stock. The legs 21 and 22 of this part are disposed in parallel relation and each lies adjacent diametrically opposite portions of the flange 19, with a longitudinal center line through each leg in radial alignment with the axis of the part 18 and the stem 15. This arrangement disposes side faces of each leg 21 and 22 tagent to a circle, the radius of which is an amount measured from the center of the part 18 to the longitudinal center-line of the inner side face of each leg.

When rotated, the flange 19 of the beating element part 18 forces or throws the material being beaten laterally away therefrom due to the centrifugal force developed thereby. This action causes a partial vacuum to form within the cup shape of this part, whereby the material below the same is forced upwardly by the action of atmospheric pressure upon the surface of the material. While the material is being agitated in the manner above pointed out, the legs 21 and 22 of the U-shaped member 20 are beating and stirring the material in a somewhat different manner, Due to the disposition of the legs 21 and 22 relatively to the axis of the element, the portion 30 of each leg acts somewhat similar to a fan blade and forces the material engaged thereby inwardly toward the center, as illustrated in dotted lines in Fig. 6. Another portion 31 of each leg forces the material engaged thereby outwardly away from the center. The combined action of the cup-shaped member 18 and the U-shaped member 20 produces a thorough mixture in the material of the ingredients thereof, or agitates it in such an efficient manner that a material, such as cream, will be rapidly whipped to the desired consistency.

While I have shown and described a preferred embodiment of my invention, it is to be understood that the same is not to be limited thereto in all of its details, as many modifications and variations thereof may be made which will come within the spirit of the invention and the scope of the appended claims.

What I claim is:

1. In a mixing device, a beating element adapted to be detachably secured to an end of a rotatable shaft, said beating element including an inverted cup-shaped member having a U-shaped loop member depending therefrom.

2. In a mixing device, a beating element adapted to be detachably secured to an end of a rotatable shaft, said beating element comprising an inverted cup-shaped member concentric to said shaft, and a U-shaped loop member depending therefrom with the legs thereof disposed adjacent the periphery thereof.

3. In a mixing device, a beating element comprising an elongated stem adapted to be secured to an end of a rotatable shaft, an inverted cup-shaped member secured to an end of said stem, and a looped member depending from said cup-shaped member.

4. In a mixing device, an inverted cup-shaped member comprising a substantially vertical flange disposed about a disc shaped portion, a U shaped loop member depending from said cup shaped member, and a stem extending upwardly from said disc shaped portion, said stem having a shaft end receiving socket in the upper end thereof, and means to clamp a shaft within said socket.

5. A stirring element for a mixing device, comprising a disc shaped part having an upwardly extending stem secured thereto at the center thereof, a flange part depending from the periphery of said disc shaped part, and a U shaped loop depending from said disc shaped part, each of the legs of said U shaped loop being secured to said disc shaped part and disposed within and adjacent opposite points of said flange part.

6. A stirring element for a mixing device, comprising an inverted cup shaped member having a disc shaped bottom with a flange depending from the periphery thereof, a loop member comprising a strip of flat material bent into a U-shaped form with the legs thereof extending upwardly in parallel relation with respect to each other and to the axis of said disc, the legs of said loop member being secured to said disc shaped bottom and disposed adjacent substantially diametrically opposite points on said flange, and a stem secured to said disc shaped bottom.

7. An agitating element for mixing materials, comprising a U shaped loop of flat strip material secured to a disc shaped part having an upwardly directed stem portion, and a flange depending from the periphery of said disc shaped part and surrounding said U shaped loop adjacent the ends of the legs thereof.

8. In a mixing device, a stirring element comprising an inverted cup-shaped member having a pair of members, each depending therefrom at substantially diametrically opposite points adjacent its periphery and being parallel to each other and to the axis of said cup-shaped member.

9. In a mixing device, a stirring element comprising an inverted cup shaped member having a pair of members, each depending therefrom at substantially diametrically opposite points adjacent its periphery, each of said depending members being parallel to each other and to the axis of said element and presenting a flat surface disposed partly on either side of the axis of said stirring element and a loop portion connecting the lower ends of said members.

10. An agitating element comprising in combination, a stem having a shaft end receiving socket in one end thereof, and means to clamp a shaft end therein, an inverted cup-shaped part secured upon and concentric to said stem at the other end thereof, said cup-shaped part having side portions and a flat bottom portion, said side portions depending substantially at right angles from the periphery of said bottom portion, a pair of members disposed at substantially diametrically opposite points of and secured to said bottom portion within said side portions, said members being in parallel relation to each other and to the axis of said stem, a portion of each member passing through said bottom portion and being turned over upon the upper surface thereof, and a loop portion connecting the free ends of said members.

11. In a mixing device, a stirring element comprising a stem adapted to be secured to the end of a rotatable shaft, a depending flange-like part encircling said stem and being concentric therewith, means to secure said flange-like part to said stem, and a pair of members each depending from said flange-like part at substantially diametrically opposite points adjacent its periphery.

12. In a mixing device, a stirring element comprising a stem adapted to be secured to the end of a rotatable shaft, a depending flange-like part encircling said stem and being concentric therewith, means to secure said flange-like part to said stem, and a pair of members each depending from said flange-like part at substantially diametrically opposite points adjacnet its periphery, and means connecting said members together at the lower parts thereof.

13. In a mixing device, a stirring element comprising a stem adapted to be secured to the end of a rotatable shaft, a depending flange-like part encircling said stem and being concentric therewith, means to secure said flange-like part to said stem, and a pair of members each depending from said flange-like part at substantially diametrically opposite points adjacent its periphery and being parallel to each other and to the axis of said flange-like part.

14. In a mixing device, a stirring element comprising a stem adapted to be secured to the end of a rotatable shaft, a depending flange-like part encircling said stem and being concentric therewith, means to secure said flange-like part to said stem, and a pair of members each depending from said flange-like part at substantially diametrically opposite points adjacent its periphery, and being parallel to each other and to the axis of said flange-like part, and a loop-shaped portion connecting the lower ends of said members.

15. A stirring element for a mixing device, comprising an axially extended flange-like member having a substantially U-shaped loop portion depending therefrom, and means to secure said member to an end of a rotatable shaft.

16. A stirring element for a mixing device, comprising a loop member having its ends extended above its loop portion, an axially extended circular flange-like member disposed above the loop portion of said loop member adjacent the extended ends thereof, and being secured to said loop member, and means to connect said combined structure to an end of a rotatable shaft for immersion of the same into the material to be mixed.

In witness whereof, I have hereunto set my hand this 29th day of June, 1927.

ALFRED C. GILBERT.